Jan. 1, 1935.  W. H. DE LANCEY  1,985,918
LIQUID DISPENSING APPARATUS
Filed Jan. 24, 1933  3 Sheets-Sheet 1

INVENTOR.
WARREN H. DE LANCEY
BY Chapin + Neal
ATTORNEYS.

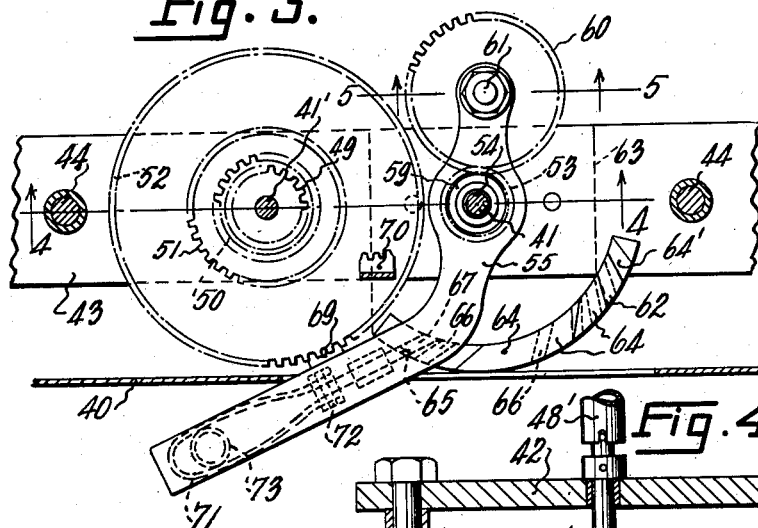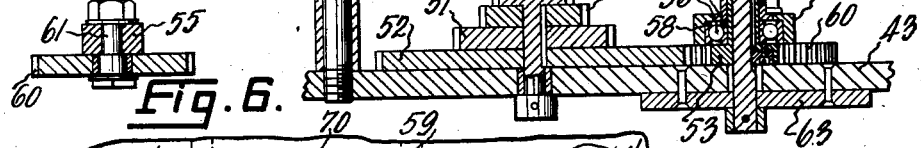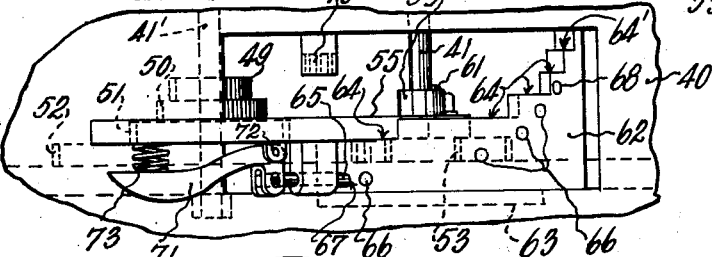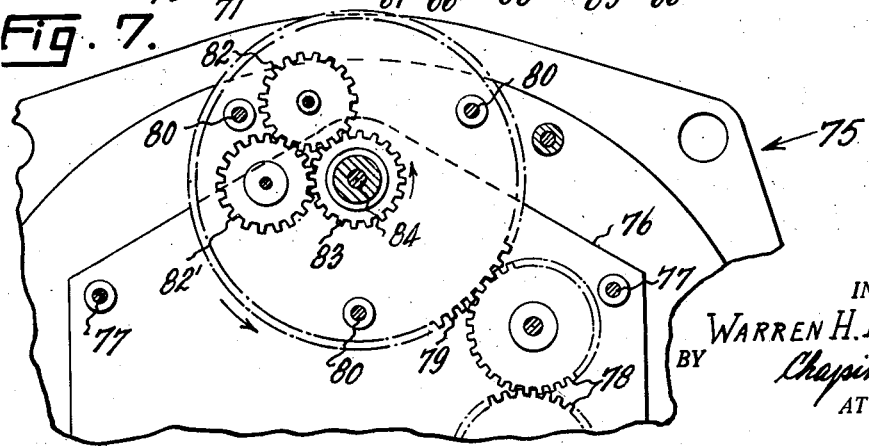

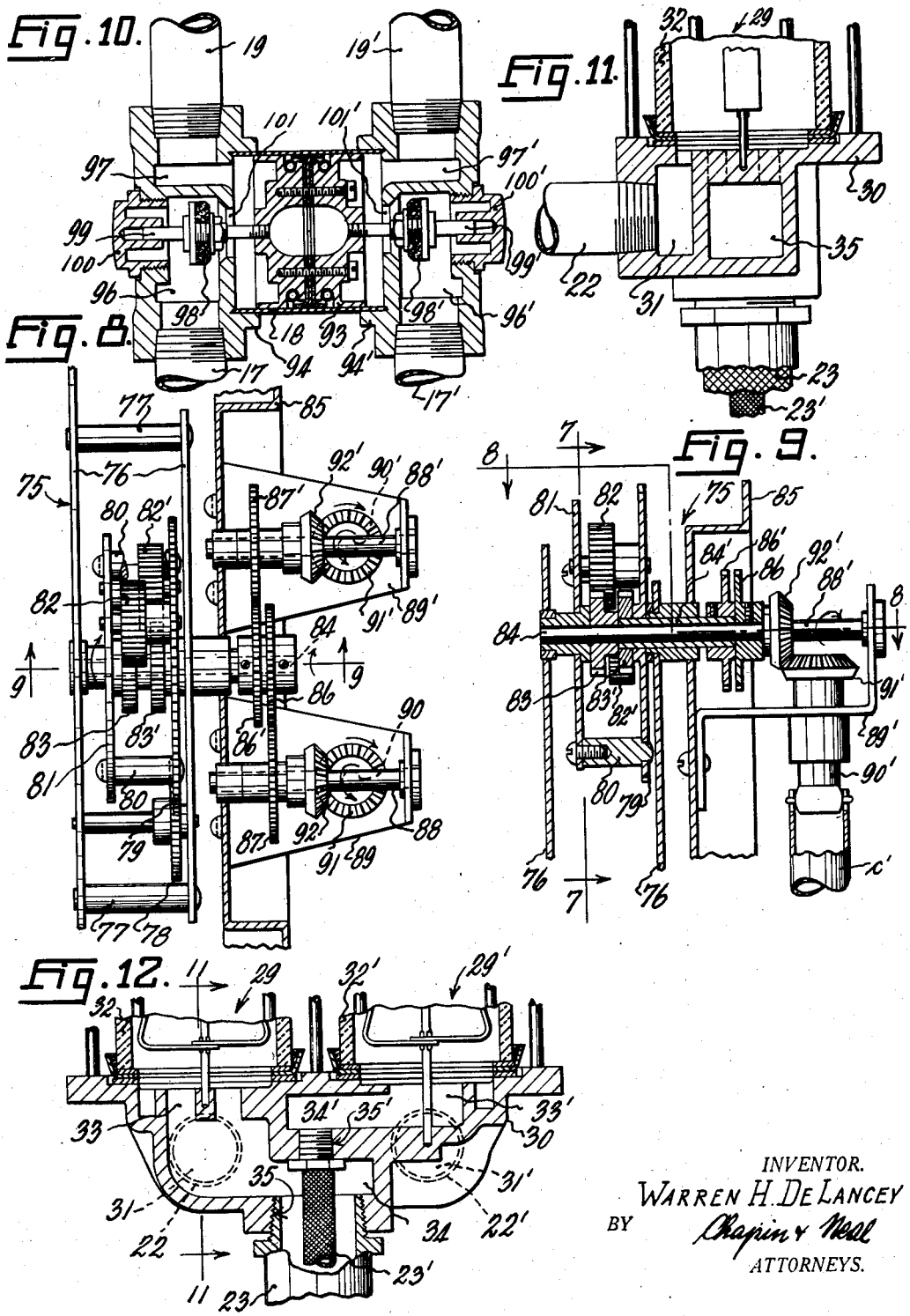

Patented Jan. 1, 1935

1,985,918

UNITED STATES PATENT OFFICE 1,985,918

LIQUID DISPENSING APPARATUS

Warren H. De Lancey, Springfield, Mass., assignor to Gilbert & Barker Manufacturing Company, West Springfield, Mass., a corporation of Massachusetts Application January 24, 1933, Serial No. 653,313

14 Claims. (Cl. 221—95)

This invention relates to improvements in apparatus for measuring and dispensing liquids, such for example as gasoline and oils.

The invention has for its general object to provide an apparatus from which measured volumes of a mixture of a plurality of different kinds or grades of liquid can be delivered, and in which means are provided for selectively predetermining the operation of the apparatus to deliver any one of a variety of different blends or mixtures of the ingredients.

One field for the invention is in the dispensing of mixtures of special gasoline, such as the so-called "Ethyl" gasoline, with ordinary gasoline. Many customers are not satisfied to use all of either one of these two kinds of gasoline and desire a mixture comprising a certain percentage of one and the balance of the other. Indeed, some claim that for various makes of automobiles different blends of these two kinds of gasoline are necessary to give best results. What works best in one automobile does not necessarily work best in an automobile of another make. In any event, the demand exists for blended gasolines and many customers have their own ideas as to the proportions of the two kinds of gasolines in the mixture which they wish to use.

Thus far, so far as I am aware, the practice is for a customer to secure from one pump a certain number of gallons of special gasoline and from another pump a certain number of gallons of ordinary gasoline, the two kinds being separately delivered into and mixed in the tank of the automobile. My invention provides a more convenient means for delivering blended gasolines. The two pumps are or may be located side by side in a single casing and can be and preferably are arranged to deliver the liquid through a single nozzle into the customer's tank.

A particular object of the invention is to provide an apparatus comprising multiple units, each including a pump, delivery line and meter, and to predetermine the proportions of the different kinds or grades of liquid delivered from the apparatus by controlling the relative speeds of the meters. For example, if there are two meters and both move at the same speed, the mixture delivered will contain equal amounts of two different liquids. If one meter moves slower than the other, the mixture comprises less of one and more of the other kind of liquid. In this way, the proportions of the different ingredients may be predetermined with accuracy.

Another object of the invention is to provide, in an apparatus in which a plurality of meters simultaneously measure a plurality of kinds of liquid, a register for indicating the total volume dispensed and including and characterized by a mechanism which enables the one counter shaft of the register to be driven simultaneously by a plurality of meter driven shafts and which sums up the movements of said shafts.

Another object of the invention is to provide in an apparatus, such as above described, a device for equalizing the pressure in the plurality of pump lines leading to the meters.

Another object of the invention is to provide, in an apparatus of the class described, a plurality of delivery hoses mounted in telescoped relation, each of said hoses being independently supplied with liquid and all of the hoses opening into a single valved nozzle, whereby the flow from a plurality of different sources can be simultaneously controlled at a single point by a single valve.

There are many other subsidiary features of invention and these will best appear as the detailed description proceeds and will be pointed out in the appended claims.

The invention will be disclosed with reference to the accompanying drawings in which:

Fig. 3 is a top plan view of the change gear transmission between the driven shafts of the two meters;

Figure 1:
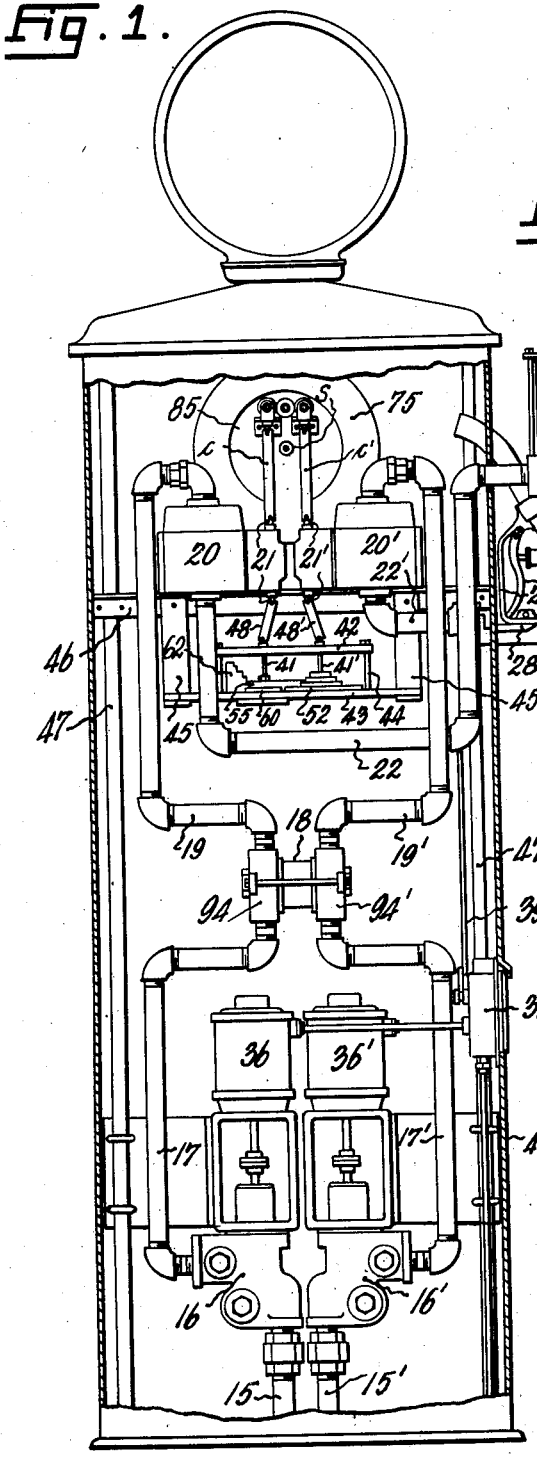
Fig. 1 is an elevational view, with parts of the casing broken away, of a gasoline dispensing apparatus embodying the invention.

Figs. 4 and 5 are sectional elevational views thereof, taken on the lines 4—4 and 5—5 respectively, of Fig. 3;

Fig. 6 is a front elevational view of the device shown in Fig. 3 and is taken oppositely from the direction in which Fig. 1 is taken;

Fig. 7 is a sectional elevational view of part of the register and shows the spur gear differential used for summing up the movements of the shafts driven by the meters, this view being taken along the line 7—7 of Fig. 9;

Fig. 8 is a sectional plan view taken on the line 8—8 of Fig. 9, showing the aforesaid differential and the connections of the meter driven shafts therewith;

Fig. 9 is a central cross sectional view taken on the line 9—9 of Fig. 8;

Fig. 10 is a sectional elevational view of the pressure equalizing device;

Fig. 11 is a cross sectional view, taken on the line 11—11 of Fig. 12 through one of the flow indicators; and Fig. 12 is a sectional elevational view showing both flow indicators and the connections of the two delivery hoses therewith.

Referring to these drawings, there is shown in Fig. 1, by way of illustrative example, one form of liquid measuring and dispensing apparatus embodying my invention. As there shown, the apparatus includes two complete dispensing and measuring units, arranged to deliver different kinds or grades of liquid to a common point of discharge, and means for coordinating the two units so that predetermined proportions of the two kinds or grades of liquid may be delivered to the common point of discharge.

Inasmuch as the two units are alike, a description of one will suffice and the corresponding parts of the other unit will be denoted by the same reference numerals primed.

Liquid is drawn up from an underground source of supply through a suction pipe 15 by a suitable pump 16 and forced upwardly through a pipe 17 into the casing 18 of a pressure equalizing means. The pumped liquid leaves casing 18 by way of a pipe 19 and enters a suitable meter 20 which drives in the usual or any suitable way, a shaft 21 adapted for connection to a register of the usual revolution counter type graduated to show gallons. Liquid passes out of meter 20 through a pipe 22 connected to a flexible hose 23 by means of which the measured liquid is delivered into the tank of the customer's car.

Figure 2:
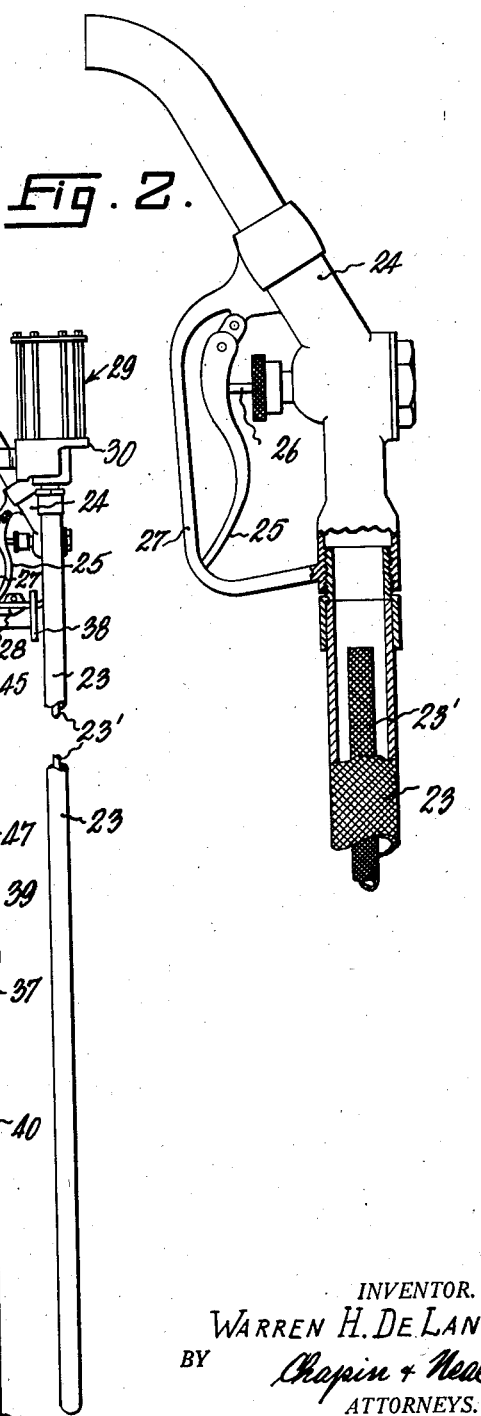
Fig. 2 is an elevational view of the valved delivery nozzle, with parts in section to show the connection of the two hoses thereto.

As a desirable, important and preferred feature, although not an indispensable one so far as all objects of the invention are concerned, the two hoses 23 and 23' are mounted one within the other, as shown in part in Figs. 2 and 12. Also, the two hoses discharge into a common hose nozzle 24. The arrangement is such that the two kinds or grades of liquid are not allowed to mix until they enter the hose nozzle, as will be clear from Fig. 2. This nozzle is of a well known type, having within it a self closing valve which can be opened by means of a lever 25 which, when pressed towards the body of the nozzle, engages and moves the stem 26 of the self closing valve. The internal construction of the nozzle is fully shown in U. S. Patent No. 1,870,918, granted August 9, 1932, on an invention of Joseph A. Logan, to which reference is made for a disclosure of the self-closing valve. The nozzle may also be equipped with an outwardly opening check valve, such as is shown in said patent. The nozzle is provided with the usual guard 27 for lever 25 and this guard may be utilized as a means for hanging up the hose nozzle, when not in use, on a suitable support such as is shown at 28 in Fig. 1.

It is common practice to interpose between the delivery end of the fixed discharge pipe and the inlet end of the flexible discharge hose, a sight flow indicator and I show herein two such indicators 29 and 29' for the discharge pipes 22 and 22', respectively. These indicators may be of any suitable type and that type herein disclosed is the same as is fully described in my U. S. Patent No. 1,844,212, dated February 9, 1932. Preferably, the two indicators are mounted on a common base 30, as shown in Fig. 12. This base is specially constructed to meet the conditions arising from the mounting of one hose within the other and, except for such conditions, the two indicators might be structurally independent. Functionally, they are independent and each operates as disclosed in the last named patent. The base 30 has separate inlet passages 31 and 31' (Fig. 12), to which pipes 22 and 22', respectively, are connected and these passages lead into the glass cylinders 32 and 32', respectively, of the indicators in the manner shown in Fig. 11 in connection with cylinder 32. Liquid discharges from these cylinders through central openings 33 and 33' in the base thereof (Fig. 12). These discharge passages 33 and 33' are provided with lateral extensions 34 and 34', respectively, which are disposed in overlying relation and provided with outlets 35 and 35', respectively, in the bottom walls thereof. The hose 23 is connected to the outlet 35 and the hose 23' passes upwardly through passage 34 and is connected to the outlet 35'.

The pumps 16 and 16' may be driven in any suitable way as by the electric motors 36 and 36' (Fig. 1). Both these motors are controlled by a single switch which is contained within the switch box 37 and operated by a lever 38 and suitable connections shown in part in Fig. 1 at 39. An example of one suitable type of switch and operating connections therefor, is shown in my U. S. Patent No. 1,880,869, dated October 4, 1932. Any suitable means however, may be used for the purpose which is simply to enable the motors to be simultaneously started and stopped from a position outside the casing 40 within which the pumps, motors, meters and associated mechanism are housed.

The pumps 16 each have the usual pressure relief valve controlling a by-pass from the discharge side to the suction side of the pump. A suitable valve and by-pass for the purpose is shown in the above identified Logan patent.

The meters are of the displacement type, as distinguished from the ordinary flow meter type. What is necessary here is that there shall be no substantial degree of slippage of liquid past the moving element of the meter. The so-called "piston" meter is a conspicuous example of the displacement type referred to. In this type of meter, no liquid can pass without moving the piston and with this characteristic, it follows that if the piston or pistons of one meter are held back relatively to the piston or pistons of the other meter, the relative rate of flow through the two meters can be controlled. It has not been thought necessary to illustrate the meter mechanism since displacement meters are well known in the art. It will suffice to state that the moving element,—a piston,—is connected to positively drive its indicator shaft, such as 21 or 21', and that by holding such shaft stationary or retarding its movement, the piston or pistons will be held stationary or their movement retarded, as the case may be, and flow of liquid through the meter will be stopped or retarded.

A change gear transmission is provided to control the relative speed of the meter shafts 21 and 21' and thus the flow of liquid through the meters. This transmission is shown in rear elevation in Fig. 1, in front elevation in Fig. 6, and in top plan in Fig. 3. It includes two vertical shafts 41 and 41', mounted near their ends in upper and lower plates 42 and 43. These plates, together with the studs 44 which hold them together in spaced parallel relation, form the frame of the transmission, such frame being suitably supported as by brackets 45 (Fig. 1) from a cross bar 46, which in turn is supported by the columns 47 of the pump frame and which serves also to support the meters 20 and 20'. The shafts 41 and 41' are connected by universal couplings 48 and 48' to the meter shafts 21 and 21', respectively. On one of the transmission shafts such as 41', a series of gears of graded sizes are fixed,—four as herein shown, marked 49, 50, 51 and 52. The other shaft 41 has slidably keyed thereto a pinion 53. This pinion (Fig. 4) has a sleeve 54 which extends upwardly therefrom through an operating lever 55 recessed to receive a ball bearing 56. The inner race 57 of this bearing is fixed to sleeve 54 and the outer race 58 is fixed to lever 55. The sleeve 54, at its upper end has a collar 59 fixed thereto which rests on top of the inner ball race 57. Since the ball bearing is fixed in the recess in lever 55, the collar 59 which rests on the ball bearing prevents the pinion 53 from axial movement relatively to lever 54. At the same time the pinion and shaft 41 can turn freely relatively to the lever. This lever also carries an intermediate gear 60 mounted on a stud 61 (see Fig. 5) and constantly in mesh with pinion 53. The lever 55 is mounted to turn about shaft 41 as an axis and, by raising the lever and turning it, the intermediate gear 60 may be caused to mesh with any one of the gears 49, 50, 51 or 52.

For the purpose of holding lever 55 in the various positions to which it may be moved, a stepped segment 62 is provided having a bracket 63 fixed to frame member 43. This segment has a series of steps affording a series of horizontal surfaces 64 on which the lever may rest. When it rests on the lowest surface 64, gear 60 is positioned at the right level to mesh with gear 52. When the lever rests on the next step, gear 63 is positioned to mesh with gear 51 and so on. A fifth step 64' is provided and, when the lever 55 rests thereon, gear 60 lies above the uppermost gear 49. To hold the lever on each step in proper position for gear 60 to mesh with the selected one of the gears 49 to 52, a locking pin 65 is mounted for radially sliding movement in lever 55 and arranged to engage in any one of a series of four holes 66, one for each of the gears 49 to 52 and formed in the periphery of segment 62. Two other holes 67 and 68 are provided in segment 62. When pin 66 is engaged in hole 67, as shown, lever 55 is held on the lower step 64 in such position that gear 60 is out of mesh with gear 52 (see Fig. 3) and so that a small gear segment 69 on lever 55 meshes with gear 52 and thereby prevents rotation of it and shafts 41', 21' and the movable element of the meter 20'. When lever 55 is moved while still on the lower step, so that pin 65 engages the lowest hole 66, segment 69 is withdrawn from mesh with gear 52 and gears 52 and 60 are thrown in mesh. When lever 55 is placed on the upper step 64' and pin 65 engages in hole 68, the intermediate gear 60 is caused to mesh with a stationary segment 70 which is fixed to plate 42. Thus, shafts 41 and 21 and the movable element of meter 20 may be held against movement but shaft 41' is free to rotate because gear 60 lies above and out of mesh with the gears 49 to 52 on shaft 41.

The locking pin 65 is withdrawn in any suitable way, as for example by a bell crank 71, pivoted at 72 to lever 55. A spring 73, interposed between lever 55 and bell crank 71, tends to move pin 65 towards the segment 62. An opening (shown in Fig. 6) is provided in casing 40 to enable the handle portion of lever 55 to extend outwardly of the casing into position to be conveniently actuated.

It will thus be clear that provision has been made, whereby the flow through either meter may be stopped and whereby the flow through one meter may be varied relatively to the other. Assuming for example, that pump 16 is used to pump ordinary gasoline and pump 16' to pump special or ethyl gasoline, then it will be possible with the apparatus described to deliver all ethyl gasoline or all ordinary gasoline, or various mixtures of the two. As shown, shaft 41' may be caused to travel at such rates relatively to shaft 41 that mixtures comprising 20, 30, 40 or 50 per cent of the special gasoline and the balance plain gasoline may be delivered. It is obvious that the gear ratios may be changed to cause mixtures of any proportions desired to be delivered and that many more gears may be added to the transmission, if other mixtures are desired.

The quantities of liquid delivered through both meters are indicated on a single register, marked 75. This register may be of any suitable type with certain modifications, to be described, to enable both meter shafts 21 and 21' to drive the pointer shaft such as $s$ (Fig. 1) of the one register. Referring to Figs. 7, 8 and 9, a portion of the inner frame of the register, comprising spaced plates 76 and the connections 77 which hold the plates in spaced relation, is shown. Between these plates the various gears forming the transmission to the movable pointer shaft or shafts are mounted. A part of the gear train is shown at 78 in Figs. 7 and 8. For the present purposes the usual driving gear for this gear train is removed and replaced by a gear 79 which forms part (the driven gear) of a spur gear differential. Supported from gear 79 in spaced parallel relation by a series of posts 80 is a disc 81 and between this disc and gear are two planet gears 82 and 82' revolubly supported in bearings in the gear 79 and disc. These gears partially overlap and intermesh, as will be clear from Fig. 9. The gear 82 is driven by a sun gear 83, fixed to a shaft 84 mounted in members 76 and projecting rearwardly through the back closure plate 85 of the register, where it carries a spur gear 86. Gear 86 is driven by a spur gear 87, fixed to a shaft 88 mounted at one end to turn in plate 85, and at the other in a bracket 89 fixed to such plate. This bracket also has a bearing for a stub shaft 90 carrying a bevel gear 91 to mesh with a similar gear 92 on shaft 88. Shaft 90 is connected by a universal coupling $c$ to meter shaft 21. Shaft 21' drives the other planet gear 82' through sun gear 83' in a similar way and corresponding parts have been marked with the same reference numerals primed. The only difference in the drive is that shaft 84' is tubular and is telescoped over shaft 84.

It is essential that the pressure in the lines 19 and 19' leading to each meter be maintained uniform and for that purpose the device shown in Fig. 10 is provided. The casing 18 is a cylinder within which a piston 93 is mounted. The ends of this cylinder are closed by heads 94 and 94', which are held together to clamp cylinder 18 therebetween as indicated in Fig. 1. Each head has inlet and outlet passages. The inlet and outlet passages 96 and 97 of head 94 connect with the pipes 17 and 19, respectively, while the corresponding passages 96' and 97' of head 94' connect with the pipes 17' and 19'. The outlet passages 97 and 97' are in constant communication with the interior of cylinder 18 at locations on opposite sides of piston 93 and when the pressures in the pipes 19 and 19' are equal, the piston will assume the mid-position shown. When such pressures become unequal the piston 93 will be moved to the right or left, as the case may be. The communication between cylinder 18 and the inlet passages 96 and 96' is controlled by valves 98 and 98', mounted on stems 99 and 99' slidably supported at one end in bearings formed in removable caps 100 and 100' and each fixed at the other end to piston 93. The valves 98 and 98' control ports 101 and 101', leading respectively from the passages 96 and 96' into the interior of the cylinder 18 and disposed on opposite sides of piston 93.

With each pump pumping liquid at the same rate against equal resistances, the piston 93 will assume the central position shown in which both inlet ports 101 and 101' are opened to an equal extent. Now assume that the moving element of meter 20' is forced, by the mechanism above described, to travel at a slower rate than the moving element of meter 20, then with the pumps 16 and 16' moving at the same speed, the pressure in the pipe 19' will build up and force piston 93 to the left causing valve 98' to throttle down, or close off if necessary, the flow through inlet port 101' until the pressures in the two pipes 19 and 19' become equal. It is to be remembered that the pumps have relief-valve controlled by-passes and these open to by-pass the pumped liquid whenever necessary, as when the ports 101 or 101' are throttled down or closed. On a reverse condition, when pressure builds up in line 19, piston 93 will move to the right causing valve 98 to throttle down or stop if necessary, the flow through port 101. If the moving element of either meter is locked against movement, as is provided for by the mechanism above described, then the valve 98 or 98' which controls the flow to that meter will be closed, but flow through the other line will be permitted. If, on the other hand, either pump becomes inoperative for any reason, as for example because of a blown fuse in the supply line leading to its driving motor, then the other pump will be rendered ineffective, as far as delivery of liquid from the apparatus or actuation of the meters is concerned. Thus, if the pump supplying pipe 17' stops while that supplying pipe 17 continues in operation, then the pressure of the liquid entering port 101 will force piston 93 to the right and close valve 98 and the pressure of liquid in inlet passage 96 acting on valve 98 will hold it closed until the pump, which supplies pipe 17' is placed in operation and causes a sufficient pressure to be built up in cylinder 18 to move piston 93 to the left and open valve 98.

The operation of the spur gear differential mechanism will now be described. The meter drive shafts 21 and 21' turn in the same direction and the concentric shafts 84 and 84' and the sun gears 83 and 83' turn in the same direction. The gears 82, 82', 83 and 83' are of equal diameter. With both sun gears turning at equal speed in the same direction (counterclockwise as viewed in Fig. 7), the planet gears 82 and 82' will not turn at all around their own axes because they each tend to turn in a clockwise direction and, being in mesh, are unable to do so. The result is that the gears 83, 83', 82 and 82' operate as if fixed to the driven gear 79 and the locked gears simply rotate about the common axis of shafts 84 and 84'. One revolution of these shafts will cause one revolution of the driven gear 79. Now if one of the meter drive shafts, say 21', is held stationary, one revolution of the other shaft will produce one-half a revolution of the driven gear 79. The sun gear 83, turning counterclockwise, drives the planet gear 82 in a clockwise direction and gear 82 drives gear 82' in a clockwise direction, causing it to roll half way around the periphery of its stationary sun gear 83', thus causing one-half revolution of gear 79. The planet gear 82 can only turn in its bearings in gear 79 to the extent permitted by its travel in an orbit about gear 83, such orbital movement being compelled by the planet gear 82' and stationary sun gear 83'. In consequence, as planet gear 82 turns it also rolls on the periphery of its driving gear 83 in the direction in which the latter is moving, and only one-half revolution of gear 82 in its bearings in gear 79 results. Now, if gear 83' is driven but at less speed than gear 83, the resultant effect on gear 79 will be produced in part by the first and in part by the second mode of operation described and a movement of gear 79 will result, which is greater than that produced with the second mode of operation and less than that produced by the first mode of operation. The erstwhile stationary sun gear 83' is now being turned in the same direction as gear 83. For example, assume that gear 83' makes one-half a revolution while gear 83 makes one revolution. It has been shown that one revolution of gears 83 and 83' will cause one revolution of gear 79. Consequently, one-half revolution of these gears 83 and 83' will cause one-half a revolution of gear 79. It has also been shown that one revolution of gear 83 while gear 83' is held stationary, will cause one-half a revolution of gear 79. Consequently, one-half a revolution of gear 83 under the same conditions will cause one-quarter of a revolution of gear 79. Now in the assumed case, the motion is equivalent to revolution of gears 83 and 83' at equal speed for one-half a revolution, and revolution of gear 83 only for another half revolution, whereby one-half and one-quarter revolutions, respectively, of gear 79 are produced, or a total of three-quarters of a revolution. The movements of the two sun gears are thus added algebraically. The gearing from gear 79 to the pointer shaft s is actually such that the pointer will show the gallons flowing through the two meters 20 but this flow is directly proportional to the number of revolutions of the meter shafts so that the shaft s is really a revolution counter. Assuming, for purely illustrative purposes, that the gearing between gear 79 and pointer shaft s is such that the movement of the gear 79 is multiplied by 2 so that one revolution of gear 79 results in two revolutions of shaft s. Then one revolution of either gear 83 or 83', while the other is held stationary, will cause one-half a revolution of gear 79 and one revolution of shaft s. If both gears 83 and 83' are simultaneously moved through one revolution, the shaft s will show two revolutions. If gear 83 makes one revolution while gear 83' makes one-half a revolution, the pointer shaft s will show one and one-half revolutions. Thus, the differential gearing sums up the movements of the two meter shafts and indicates the total on the dial of the meter.

In operation, the operator shifts lever 55 into the desired one of its several positions to give the desired speed ratio between the movable elements of the two meters to produce the desired blend or mixture of the two kinds of gasoline. As above described, the apparatus is such that all of either kind of gasoline may be delivered or various mixtures of the two kinds. The operator then starts the motors in the usual way and controls the flow of the mixture at the delivery nozzle 24 by means of valve lever 25. When the pointer on shaft s shows that the desired quantity has been delivered, he stops the flow at nozzle 24 and then stops the motors. The desired quantity of the desired mixture of the two gasolines will then have been delivered. It will be necessary to have price tables prepared for use with the register, to denote the proper prices per gallon for the various blends or mixtures. There will also be suitable designations beside each position of lever 55 to show the proportions of the two ingredients in the mixture.

Thus, I have provided a measuring and dispensing apparatus for delivering mixtures of various kinds of liquids in predetermined proportions. The invention is particularly useful in dispensing blends of two kinds of gasoline but it is is not, however, confined to this specific use. The invention is also capable of use with other forms of dispensing apparatus than the one form,—the so-called meter type,—herein shown and is broadly applicable to any apparatus where the relative rate of operation of two or more independent liquid forcing units can be varied to predetermine the proportions of the different liquids in the mixture delivered by the apparatus. This feature may be used independently of the other features such as the adding mechanism for totalizing the movements of the driven quantity indicator shafts of the dispensing units, and independently of the telescoped delivery hoses. Each of these three features is capable of use independently of the others, notwithstanding that the maximum benefits from the invention are secured when all three features are used.

What I claim is:

1. In a liquid dispensing apparatus, a plurality of meters each having a driven shaft the movement of which is directly proportional to the amount of liquid passed through its meter, a rotatable member to indicate the total quantity of liquid passed through said meters, and a differential mechanism having driving shafts one for each of the first named shafts and connected thereto and a driven shaft connected to drive said member.

2. In a liquid dispensing apparatus, a rotatable member to indicate the total quantities of liquid dispensed, a pair of dispensing units each having a rotatable member movable in direct proportion to the amount of liquid dispensed, and connections including a single differential gear mechanism interposed between said last-named members for driving the first named member from both last named members and to an extent such that the movements of the first named member are directly proportional to the sum of the movements of the two last named members.

3. In a liquid dispensing apparatus, a rotatable member to indicate the total quantities of liquid dispensed, a pair of dispensing units each having a rotatable member movable in direct proportion to the amount of liquid dispensed, and connections including a spur gear differential mechanism interposed between said last named members for driving the first named member from both last named members and to an extent such that the movements of the first named member are directly proportional to the sum of the movements of the two last named members.

4. In a liquid dispensing apparatus, a rotatable member to indicate the total quantities of liquid dispensed, a pair of dispensing units each having a rotatable member movable in direct proportion to the amount of liquid dispensed, a spur gear differential mechanism including concentric shafts connected one to each last named member, sun gears one on each of said shafts, a driven gear mounted to turn freely about the axis of said shafts and connected to drive the first named member, and intermeshing planet gears one for each sun gear and in mesh therewith and rotatably supported by said driven gear.

5. Liquid measuring and dispensing apparatus, comprising, a plurality of measuring and dispensing units for dispensing different kinds of liquid, means for simultaneously operating said units, each unit having a rotatable member the movements of which are directly proportional to the amounts of liquid measured and dispensed thereby, a variable speed transmission interconnecting said members, whereby their relative rates of movement may be controlled and a mixture having predetermined proportions of said kinds of liquid may be delivered from and measured by said apparatus, and means for equalizing the pressures acting on said measuring units.

6. Liquid measuring and dispensing apparatus, comprising, a plurality of measuring and dispensing units for dispensing different kinds of liquid, means for simultaneously operating said units, each unit having a rotatable member the movements of which are directly proportional to the amounts of liquid measured and dispensed thereby, a variable speed transmission interconnecting said members, whereby their relative rates of movement may be controlled and a mixture having predetermined proportions of said kinds of liquid may be delivered from and measured by said apparatus, and means for locking certain but not all of said members against rotation when desired.

7. Liquid dispensing apparatus, comprising, a plurality of independent and simultaneously operable liquid forcing units, a displacement meter for each such unit and having a rotatable member movable by the liquid forced therethrough, means for equalizing the pressures acting on said meters, and selectively operable means for coupling said members to move at any one of a plurality of predetermined speed ratios.

8. Liquid dispensing apparatus, comprising, a plurality of independent and simultaneously operable liquid forcing units, a displacement meter for each such unit and having a rotatable member movable by the liquid forced therethrough, selectively operable means for coupling said members to move at any one of a plurality of predetermined speed ratios, and means operable on the failure of any one unit to force liquid to render the other units inoperative until such failure has been remedied.

9. Liquid dispensing apparatus, comprising, a plurality of independent and simultaneously operable liquid forcing units, a displacement meter for each such unit and having a rotatable member movable by the liquid forced therethrough, selectively operable means for coupling said members to move at any one of a plurality of predetermined speed ratios and for locking certain but not all of said members when desired.

10. Liquid measuring and dispensing apparatus, comprising, a plurality of measuring and dispensing units for dispensing different kinds of liquid, means for simultaneously operating said units, means for selectively varying the relative rate of operation of said units, whereby a mixture having predetermined proportions of said kinds of liquid may be measured by and delivered from said apparatus, a plurality of flexible delivery hoses one for each unit and mounted one within the other, and a valved nozzle connected to the outermost hose and controlling the discharge from all said hoses.

11. In a liquid dispensing apparatus, a pair of independent pumping units for different kinds of liquids, means for simultaneously operating said units, a delivery line for each unit through which liquid is forced thereby, a displacement meter interposed in each delivery line and having a rotatable member the movements of which are in direct proportion to the volume of liquid measured by the meter, means for equalizing the pressure in said delivery lines on the inlet sides of their meters, and a change gear transmission for interconnecting said members and enabling their relative rates of movement to be varied, whereby a mixture having predetermined proportions of said kinds of liquid may be delivered.

12. In a liquid dispensing apparatus, a pair of independent pumping units for different kinds of liquids, means for simultaneously operating said units, a delivery line for each unit through which liquid is forced thereby, a displacement meter interposed in each delivery line and having a rotatable member the movements of which are in direct proportion to the volume of liquid measured by the meter, means for equalizing the pressure in said delivery lines on the inlet sides of their meters, a change gear transmission for interconnecting said members and enabling their relative rates of movement to be varied, whereby a mixture having predetermined proportions of said kinds of liquid may be delivered, and means for locking either one of said members whereby all of either kind of liquid may be delivered when desired.

13. In a liquid dispensing apparatus, a pair of independent pumping units for different kinds of liquids, means for simultaneously operating said units, a delivery line for each unit through which liquid is forced thereby, a displacement meter interposed in each delivery line and having a rotatable member the movements of which are in direct proportion to the volume of liquid measured by the meter, means for equalizing the pressure in said delivery lines on the inlet sides of their meters, a change gear transmission for interconnecting said members and enabling their relative rates of movement to be varied, whereby a mixture having predetermined proportions of said kinds of liquid may be delivered, a delivery hose for one of said lines, a nozzle at the end of said hose, and a hose for the other delivery line extending inside the first named hose to said nozzle, whereby the two liquids are prevented from mixing until they reach the nozzle.

14. Liquid dispensing apparatus, comprising, a plurality of pumps for dispensing different kinds of liquid, means for simultaneously operating said pumps, a meter for each pump connected thereto to receive and measure the pumped liquid, each such meter having a shaft driven by the liquid pumped therethrough, means for selectively varying the relative rate of operation of said meter shafts, and means for equalizing the pressures acting to drive said shafts, whereby a mixture having predetermined proportions of said kinds of liquid may be measured by and delivered from said apparatus.

WARREN H. DE LANCEY.